United States Patent
Schmidt et al.

(10) Patent No.: US 6,614,404 B1
(45) Date of Patent: Sep. 2, 2003

(54) MULTIBEAM RADAR SENSOR WITH A FIXING DEVICE FOR A FOCUSING BODY

(75) Inventors: Ewald Schmidt, Ludwigsburg (DE); Thomas Beez, Weinsberg (DE)

(73) Assignee: Robert Bosch GmbH, Stuttgart (DE)

(*) Notice: Subject to any disclaimer, the term of this patent is extended or adjusted under 35 U.S.C. 154(b) by 38 days.

(21) Appl. No.: 09/807,672

(22) PCT Filed: Jul. 21, 2000

(86) PCT No.: PCT/DE00/02374
§ 371 (c)(1), (2), (4) Date: May 24, 2001

(87) PCT Pub. No.: WO01/14906
PCT Pub. Date: Mar. 1, 2001

(30) Foreign Application Priority Data

Aug. 21, 1999 (DE) .......................... 199 39 834

(51) Int. Cl.⁷ ................................ G01S 7/03
(52) U.S. Cl. ....................... 343/753; 343/785
(58) Field of Search .................. 343/753, 700 MS, 343/767, 785, 770; 342/175

(56) References Cited

U.S. PATENT DOCUMENTS

| | | | |
|---|---|---|---|
| 5,757,323 A | 5/1998 | Spencer | 343/700 MS |
| 5,867,120 A * | 2/1999 | Ishikawa et al. | 342/175 |
| 6,075,492 A | 6/2000 | Schmidt et al. | 343/753 |

FOREIGN PATENT DOCUMENTS

| | | |
|---|---|---|
| DE | 197 10 811 A1 | 9/1998 |
| GB | 2 303 491 A | 2/1997 |
| WO | 97/02496 | 1/1997 |
| WO | 98 35403 A | 8/1998 |

* cited by examiner

Primary Examiner—James Clinger
(74) Attorney, Agent, or Firm—Michael J. Striker

(57) ABSTRACT

According to the invention, a multi-beam radar sensor for microwaves is proposed, in which between a lens and the transmitter/receiver elements (6), focusing bodies (1) are disposed in such a way that they prefocus the radiation of an applicable transmitter/receiver element (6) with respect to the dielectric lens (8). The focusing bodies (1) are retained by a dielectric plate (2), into which a mount (4) is inserted. The mount (4) is embodied with regard to its material and geometric dimensions such that the least possible coupling between the individual focusing bodies (1) occurs. To attain this object, the mount (4) is embodied by recesses (5) in the regions between the focusing bodies (1). For simpler assembly and adjustment, bores (3) and adjustment openings (10) are provided.

8 Claims, 2 Drawing Sheets

MULTIBEAM RADAR SENSOR WITH A FIXING DEVICE FOR A FOCUSING BODY

PRIOR ART

Figure 1:
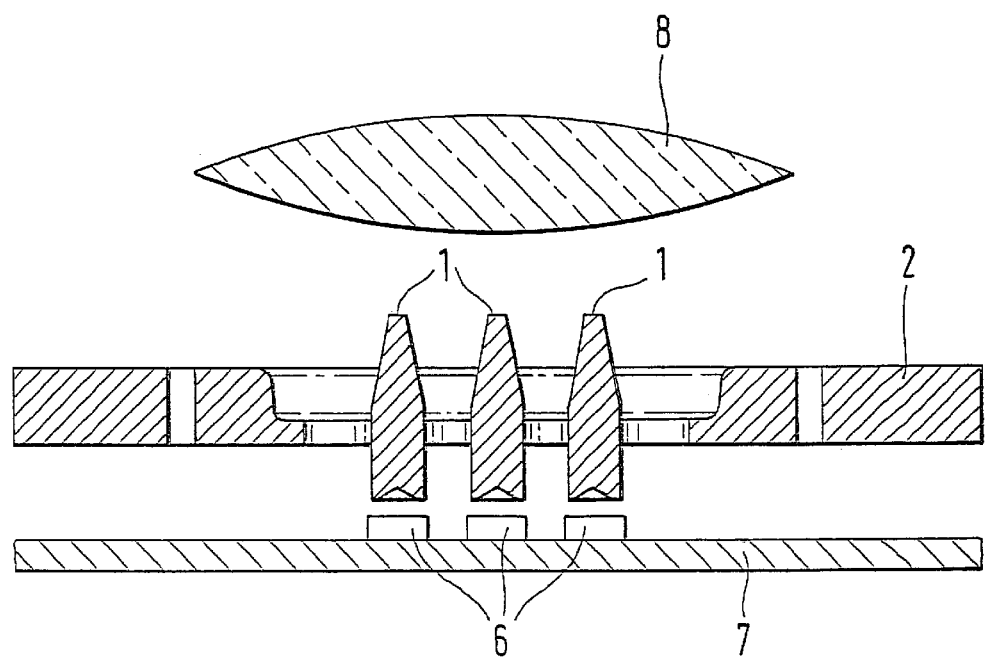

The invention is based on a multi-beam radar sensor having at least one transmitter/receiver element on a substrate and having a focusing body, which is assigned to each transmitter/receiver element for prefocusing, as generically defined by the preamble to the main claim. Radar sensors in which common antennas are used for both transmission and reception, so-called monostatic radar sensors, are known for instance from International Patent Disclosure WO 97/02496. In this case, an FMCW radar sensor for a vehicle is proposed for detecting objects; in it, three transmitter/receiver elements, for instance, or transmission/reception antenna feeds, or so-called patches, are mounted on the lateral structure of a microstrip. In the beam path, before each patch, there is additionally a dielectric aerial, to achieve better illumination of the dielectric lens and thus to attain prefocusing. However, it has been found that proper function of the dielectric aerial is assured only if the dielectric aerial is positioned exactly. Even the slightest deviation from the ideal position causes overshadowing of the lens or coupling to adjacent dielectric aerials.

From German Patent Disclosure DE 197 10 811 A1, a further device for aimed projection and/or pickup of electromagnetic waves is known. This device comprises at least one antenna element, one dielectric lens, and one dielectric body, which is disposed between the antenna element and the dielectric lens. This dielectric body again serves to prevent overshadowing of the dielectric lens and serves to prefocus the electromagnetic millimeter waves projected or picked up by the antenna element. To simplify the exact adjustment required, the dielectric body is stretched out flat and is preferably cup-shaped. It is considered unfavorable in this respect that the electromagnetic waves of the individual antenna elements are not decoupled by the dielectric body, since one common dielectric body is used for all the antenna elements.

DRAWING

One exemplary embodiment of the invention is shown in the drawing and described in further detail in the ensuing description.

Figure 2:
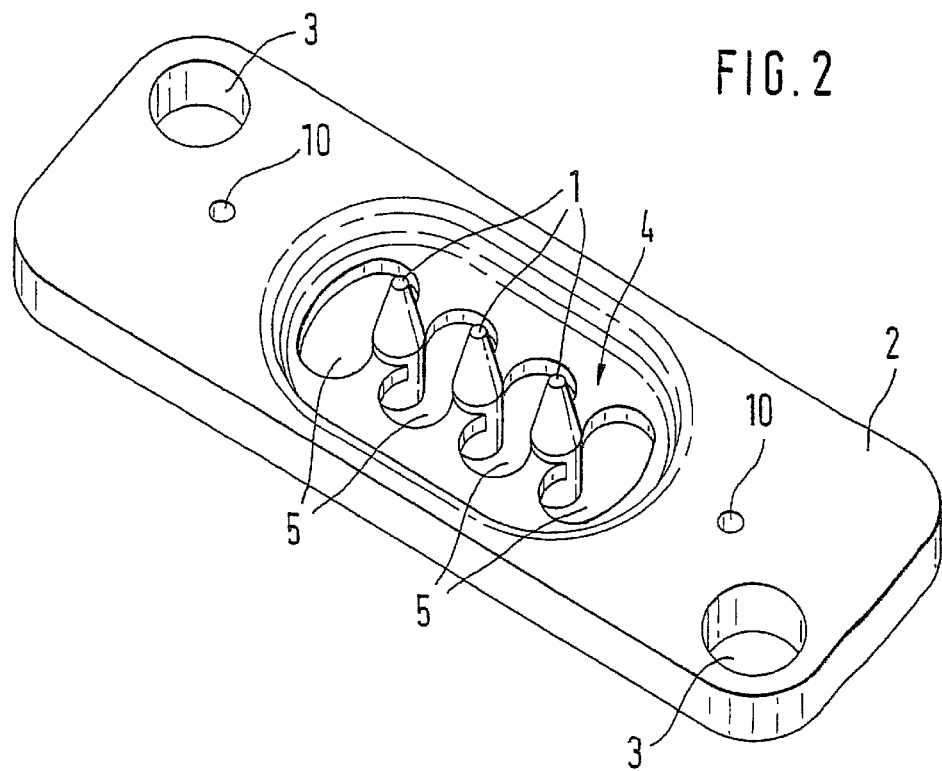

FIG. 1 shows a schematic sectional view of a mount;

FIG. 2 a three-dimensional view of a dielectric plate with the mount; and

Figure 3:
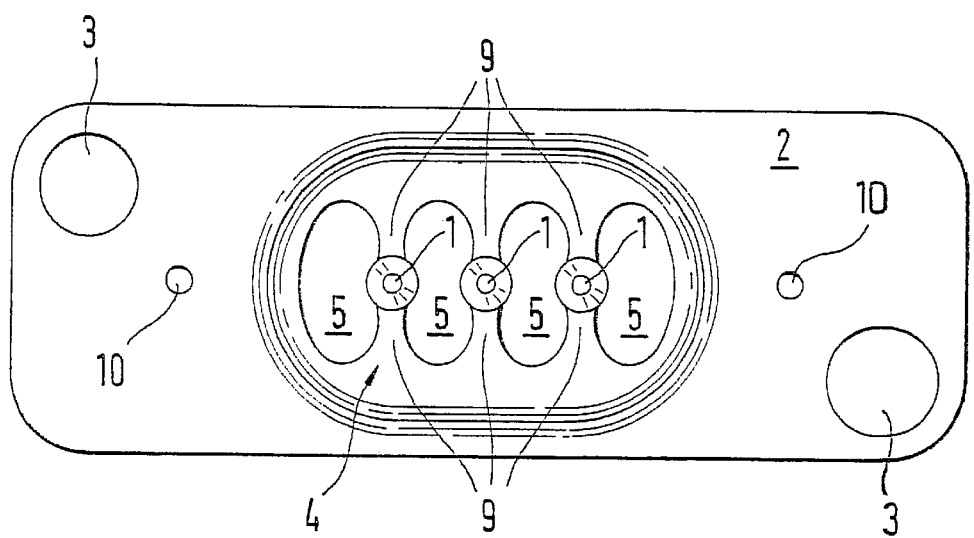

FIG. 3 shows a plan view.

DESCRIPTION OF THE EXEMPLARY EMBODIMENT

For the sake of simplicity and clarity, in the schematic sectional view of FIG. 1 the conventional components of the radar sensor, such as the oscillator, mixer, housing, etc., are not shown. FIG. 1 therefore shows only the components that belong directly to the invention: Located on a substrate 7, which is typically made by microwave conductor track technology, there are a total of three, for instance, transmitter/receiver elements 6 for microwaves disposed side by side. The transmitter/receiver elements transmit millimeter waves and receive the echo beams, reflected from some object, with a time lag. Above the transmitter/receiver elements 6, and above an air gap from each transmitter/receiver element 6, there is a focusing body 1, which is preferably embodied of a cone-shaped plastic material with a high dielectric constant. These focusing bodies 1 are known per se and have the task of aiming the radiation of the elements 6 with respect to the dielectric focusing lens 8 disposed spatially above them in such a way that the least possible scattering of the microwaves occurs. For mechanically securing the focusing bodies 1 and adjusting them exactly with regard to the transmitter/receiver elements 6, a dielectric plate 2 is provided, with a suitable mount 4 let into it.

In FIG. 2, the dielectric plate 2 is shown along with the mount 4 and the focusing bodies 1 in a three-dimensional view. The dielectric plate 2 is embodied such that it can be secured via two diametrically opposed bores 3 at the desired spacing from the substrate 7. For precise adjustment, two adjustment openings 10 are also provided, which can be engaged by a mandrel, not shown, so that the dielectric plate is adjusted exactly relative to the substrate 7. Manual calibration or like is then no longer necessary. In the region of the transmitter/receiver elements 6 in the dielectric plate 2, a larger opening is provided, into which a mount 4 is fitted. The size of this opening or the mechanical dimensions of the mount 4 with respect to the diameter, thickness, and the choice of material are selected such that the coupling effects to adjacent focusing bodies 1 are as slight as possible. For this reason, the mount 4, in the interstices between adjacent focusing bodies 1, has recesses 5, since coupling is the least across the air path between the focusing bodies 1. To enable the focusing bodies 1 to gain a mechanical hold, tongues 9 are disposed transversely to the recesses 5, as the plan view of FIG. 3 shows. From FIG. 3, but especially from FIG. 1 as well, it can be seen 5 that the mount 4 is embodied as thinner than the dielectric plate 2. By a suitable choice of the materials and of the dimension and shape of the mount 4, the coupling between the focusing bodies 1 can be minimized. Care must be taken that the air gap between the focusing bodies 1 be as large as possible, but that the tongues be shaped such that they still assure a secure hold of the focusing bodies 1, especially in the event of a temperature change and mechanical stresses such as vibration and bending. Given a suitable design of the mount 4, optimal prefocusing by the focusing bodies 1 is thus attained.

In a further feature of the invention, it is provided that the entire arrangement, comprising the plate 2, mount 4, tongues 5 and focusing bodies 1, be made in a single operation, for instance as a plastic injection-molded part.

What is claimed is:

1. A multi-beam radar sensor having at least two transmitter/receiver elements (6) on a substrate (7), having a focusing body (1), which is assigned to each transmitter/receiver element (6) for prefocusing the beam path, having a mount (4) for the focusing body (1), and having a dielectric lens (8) which is disposed in the beam path of the transmitter/receiver element (6) and of the focusing body (1), characterized in that the mount (4) is embodied with regard to its material, its geometric dimensions and its contact points with the focusing bodies (1) in such a way that the coupling of energy to the adjacent focusing body (1) is minimized, and wherein the mount (4) is embodied with a recess (5) between the focusing bodies (1).

2. The radar sensor of claim 1, characterized in that the mount (4) contains at least one material having a low dielectric constant.

3. The radar sensor of claim 1 or 2, characterized in that the mount (4) is embodied such that it fixes the focusing body (1) in only a portion of its circumference.

4. The radar sensor of claim 1, characterized in that the mount (4) is embodied so as to preserve the adjustment of the focusing body (1) relative to the transmitter/receiver element (6) and the focusing lens (8) in the event of temperature changes.

5. The radar sensor of claim 1, characterized in that the mount (4) is embodied so as to preserve the adjustment of the focusing body (1) relative to the transmitter/receiver element (6) and the focusing lens (8) in the event of mechanical stresses, such as impact, bending and vibration.

6. The radar sensor of one of the foregoing claims, characterized in that the mount (4) is embodied with at least two opposed tongues (9), which fix the focusing body (1).

7. The radar sensor of claim 6, characterized in that the tongues (9) are disposed on the side remote from the adjacent focusing body (1).

8. The radar sensor of one of the foregoing claims, characterized in that the mount (4) is fixed in an opening of a dielectric plate (2); that the dielectric plate (2) is thicker than the mount (4); and that the dielectric plate (2) or the mount has at least two adjustment openings (10) for precise alignment with respect to the transmitter/receiver element (6) on the substrate (7).

* * * * *